(12) United States Patent
Quiazon et al.

(10) Patent No.: US 11,670,793 B2
(45) Date of Patent: *Jun. 6, 2023

(54) FUEL CELL STACK INCLUDING WITNESS MARKS AND INSPECTION METHOD THEREOF

(71) Applicant: BLOOM ENERGY CORPORATION, San Jose, CA (US)

(72) Inventors: Raphael Quiazon, Santa Clara, CA (US); Arne Ballantine, Incline Village, NV (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/246,193

(22) Filed: Apr. 30, 2021

(65) Prior Publication Data

US 2021/0257646 A1 Aug. 19, 2021

Related U.S. Application Data

(62) Division of application No. 16/206,044, filed on Nov. 30, 2018, now Pat. No. 11,088,382.

(51) Int. Cl.
*H01M 8/2465* (2016.01)
*H01M 8/026* (2016.01)
*H01M 8/2432* (2016.01)
*H01M 8/0273* (2016.01)
*H01M 8/2404* (2016.01)
*H01M 8/12* (2016.01)

(52) U.S. Cl.
CPC ......... *H01M 8/2465* (2013.01); *H01M 8/026* (2013.01); *H01M 8/0273* (2013.01); *H01M 8/2404* (2016.02); *H01M 8/2432* (2016.02); *H01M 2008/1293* (2013.01)

(58) Field of Classification Search
CPC ............ H01M 8/2465; H01M 8/2404; H01M 8/2432; H01M 8/026; H01M 8/0273; H01M 2008/1293
See application file for complete search history.

(56) References Cited

U.S. PATENT DOCUMENTS

| | | |
|---|---|---|
| 9,164,064 B2 | 10/2015 | Couse et al. |
| 9,176,085 B2 | 11/2015 | Gottmann et al. |
| 9,618,458 B2 | 4/2017 | Couse et al. |
| 9,678,501 B2 | 6/2017 | Couse et al. |
| 9,784,625 B2 | 10/2017 | Couse et al. |
| 9,945,815 B2 | 4/2018 | Wilson et al. |
| 2008/0268316 A1 | 10/2008 | Park et al. |

(Continued)

*Primary Examiner* — Jane J Rhee
(74) *Attorney, Agent, or Firm* — The Marbury Law Group PLLC

(57) ABSTRACT

A fuel cell stack and inspection method, the fuel cell stack including fuel cells disposed in a stack and interconnects disposed between the fuel cells. Each fuel cell includes an electrolyte, an anode disposed on a first side of the electrolyte, a cathode disposed on an opposing second side of an electrolyte, and a witness mark disposed on the first side of the electrolyte. Each interconnect includes first ribs disposed on air side of the interconnect and at least partially defining oxidant channels, and second ribs disposed on an opposing fuel side of the interconnect and at least partially defining fuel channels. The witness mark of each fuel cell is visible from outside of the stack when the cathode directly faces the air side of an adjacent interconnect.

13 Claims, 5 Drawing Sheets

(56) References Cited

U.S. PATENT DOCUMENTS

| | | |
|---|---|---|
| 2013/0069663 A1 | 3/2013 | Gottmann et al. |
| 2013/0230072 A1 | 9/2013 | Couse et al. |
| 2014/0193064 A1 | 7/2014 | Couse et al. |
| 2014/0195031 A1 | 7/2014 | Couse et al. |
| 2016/0011071 A1 | 1/2016 | Wilson et al. |
| 2016/0269436 A1 | 9/2016 | Danielson et al. |
| 2017/0110746 A1 | 4/2017 | Mack et al. |
| 2020/0176805 A1 | 6/2020 | Quiazon et al. |

FUEL CELL STACK INCLUDING WITNESS MARKS AND INSPECTION METHOD THEREOF

FIELD

The present invention is directed to fuel cells and inspection methods, specifically to fuel cell stacks including fuel cells having witness marks that are viewable outside of the stack.

BACKGROUND

A typical solid oxide fuel cell stack includes multiple fuel cells separated by metallic interconnects (IC) which provide both electrical connection between adjacent cells in the stack and channels for delivery and removal of fuel and oxidant.

SUMMARY

According to various embodiments, provided is a fuel cell stack and inspection method, the fuel cell stack including fuel cells disposed in a stack and interconnects disposed between the fuel cells. Each fuel cell includes an electrolyte, an anode disposed on a first side of the electrolyte, a cathode disposed on an opposing second side of an electrolyte, and a witness mark disposed on the first side of the electrolyte. Each interconnect includes first ribs disposed on air side of the interconnect and at least partially defining oxidant channels, and second ribs disposed on an opposing fuel side of the interconnect and at least partially defining fuel channels. The witness mark of each fuel cell is visible from outside of the stack when the cathode directly faces the air side of an adjacent interconnect.

According to various embodiments, provided is a solid oxide fuel cell comprising: a solid oxide electrolyte; a cathode disposed on a first side of the electrolyte; an anode disposed on an opposing second side of the electrolyte; and a witness mark disposed on the electrolyte outside of the perimeter of the cathode.

According to various embodiments, provided is a method of forming a fuel cell stack, the method comprising: assembling a fuel cell stack comprising fuel cells having witness marks, and interconnects separating the fuel cells; externally inspecting the stack to identify any fuel cells that do not have witness marks that are visible outside of the stack; and determining whether any identified fuel cells are inverted or defective.

DETAILED DESCRIPTION

Figure 1A:
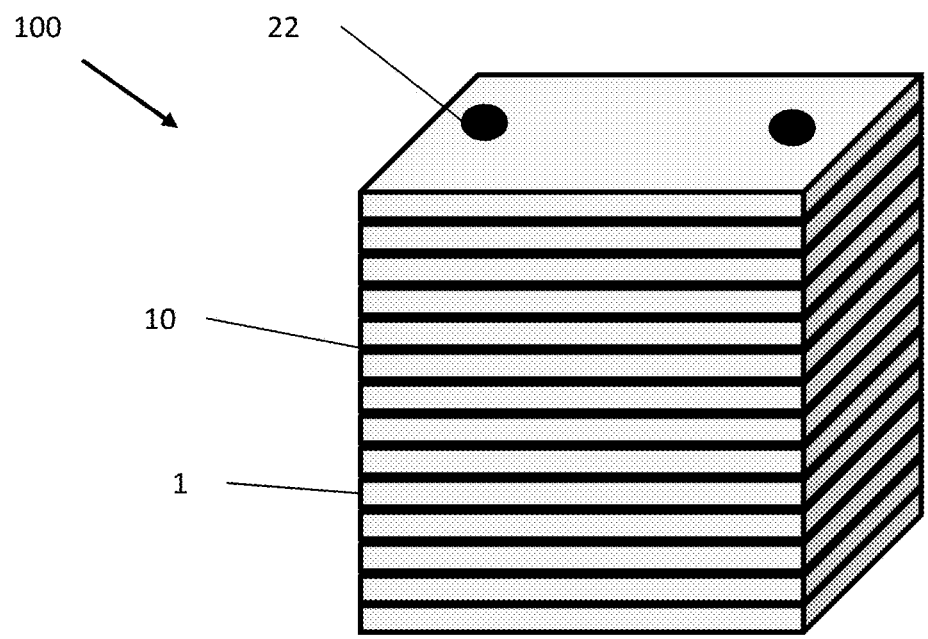
FIG. 1A is a perspective view of a SOFC stack, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected directly to power conditioning equipment and the power (i.e., electricity) output of the stack or comprises a portion of a fuel cell column that contains terminal plates which provide electrical output.

Anode and cathode sides of fuel cells are difficult to distinguish. As such, during assembly of the stack, one or more fuel cells may be inadvertently inverted, such that an anode of the inverted fuel cell faces the fuel side of an adjacent interconnect. During operation of such a stack, the cathode of the inverted fuel cell is provided with fuel and an anode of the inverted fuel cell is provided with air, leading to the inactivation of the inverted fuel cell. Therefore, embodiments of the present disclosure provide a fuel cell stack and inspection method whereby improperly arranged fuel cells and/or fuel cells that lack a cathode or anode, may be easily identified from outside of the stack.

Figure 1B:
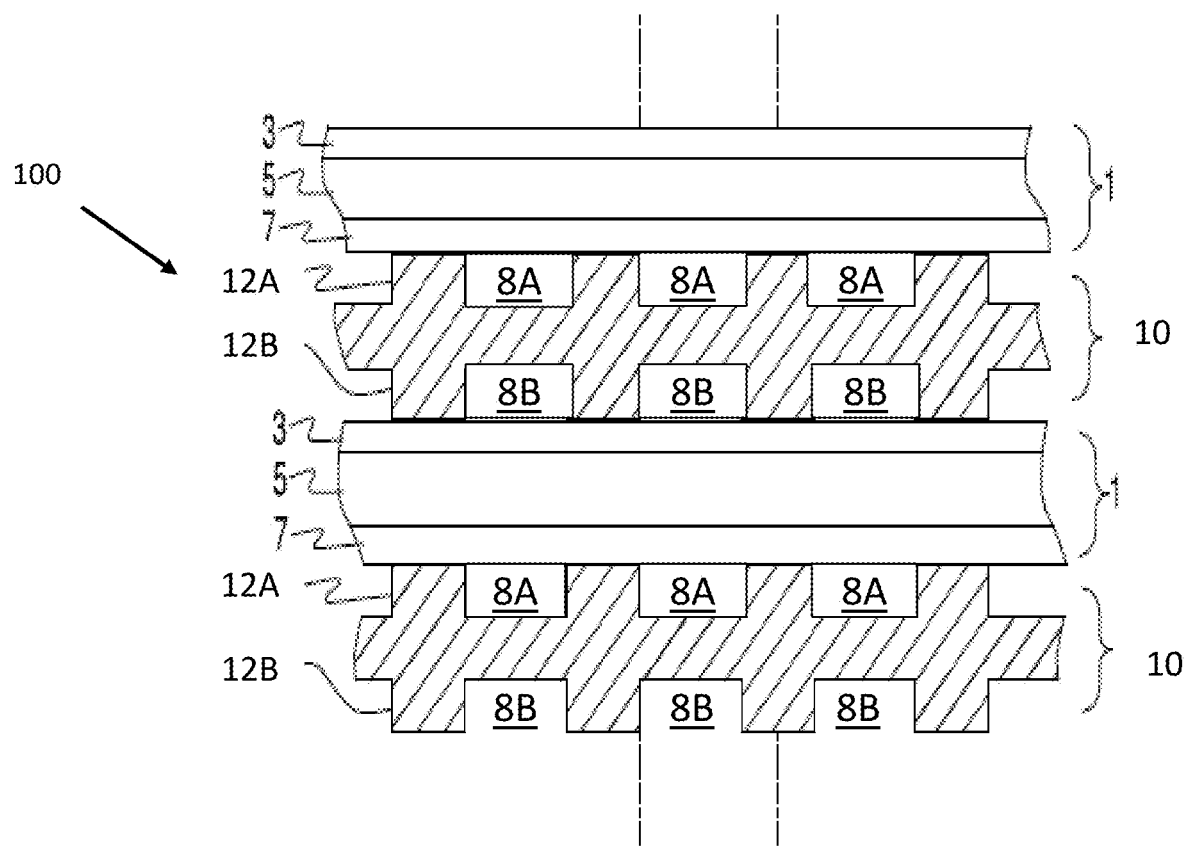
FIG. 1B is a cross-sectional view of a portion of the stack of FIG. 1A.

FIG. 1A is a perspective view of a fuel cell stack 100, and FIG. 1B is a sectional view of a portion of the stack 100, according to various embodiments of the present disclosure. Referring to FIGS. 1A and 1B, the stack 100 may be a solid oxide fuel cell (SOFC) stack that includes fuel cells 1 separated by interconnects 10. Referring to FIG. 1B, each fuel cell 1 comprises a cathode 3, a solid oxide electrolyte 5, and an anode 7.

Various materials may be used for the cathode 3, electrolyte 5, and anode 7. For example, the anode 7 may comprise a cermet layer comprising a nickel containing phase and a ceramic phase. The nickel containing phase may consist entirely of nickel in a reduced state. This phase may form nickel oxide when it is in an oxidized state. Thus, the anode 7 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte 5 may comprise a stabilized zirconia, such as scandia stabilized zirconia (SSZ), scandia and ceria stabilized zirconia, scandia, ceria and ytterbia stabilized zirconia, or yttria stabilized zirconia (YSZ). Alternatively, the electrolyte 5 may comprise another ionically conductive material, such as a doped ceria.

The cathode 3 may comprise a layer of an electrically conductive material, such as an electrically conductive perovskite material, such as lanthanum strontium manganite (LSM). Other conductive perovskites, such as LSCo, etc., or metals, such as Pt, may also be used. The cathode 3 may also contain a ceramic phase similar to the anode 7. The electrodes and the electrolyte may each comprise one or more sublayers of one or more of the above described materials.

Fuel cell stacks are frequently built from a multiplicity of fuel cells 1 in the form of planar elements, tubes, or other geometries. Although the fuel cell stack 100 in FIG. 1 is vertically oriented, fuel cell stacks may be oriented horizontally or in any other direction. Fuel and air may be provided to the electrochemically active surface, which can be large. For example, fuel may be provided through fuel conduits 22 (e.g., fuel riser openings) formed in each interconnect 10 and fuel cell 1, while air may be provided from the side of the stack between air side ribs of the interconnects 10.

Each interconnect 10 electrically connects adjacent fuel cells 1 in the stack 100. In particular, an interconnect 10 may electrically connect the anode 7 of one fuel cell 1 to the cathode 3 of an adjacent fuel cell 1. FIG. 1B shows that the lower fuel cell 1 is located between two interconnects 10. A Ni mesh (not shown) may be used to electrically connect the interconnect 10 to the anode 7 of an adjacent fuel cell 1.

Each interconnect 10 includes fuel-side ribs 12A that at least partially define fuel channels 8A and air-side ribs 12B that at least partially define oxidant (e.g., air) channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 or less weight percent yttrium and balance chromium alloy), and may electrically connect the anode or fuel-side of one fuel cell 1 to the cathode or air-side of an adjacent fuel cell 1. An electrically conductive contact layer, such as a nickel contact layer, may be provided between anodes 7 and each interconnect 10. Another optional electrically conductive contact layer may be provided between the cathodes 3 and each interconnect 10.

Figure 2A:
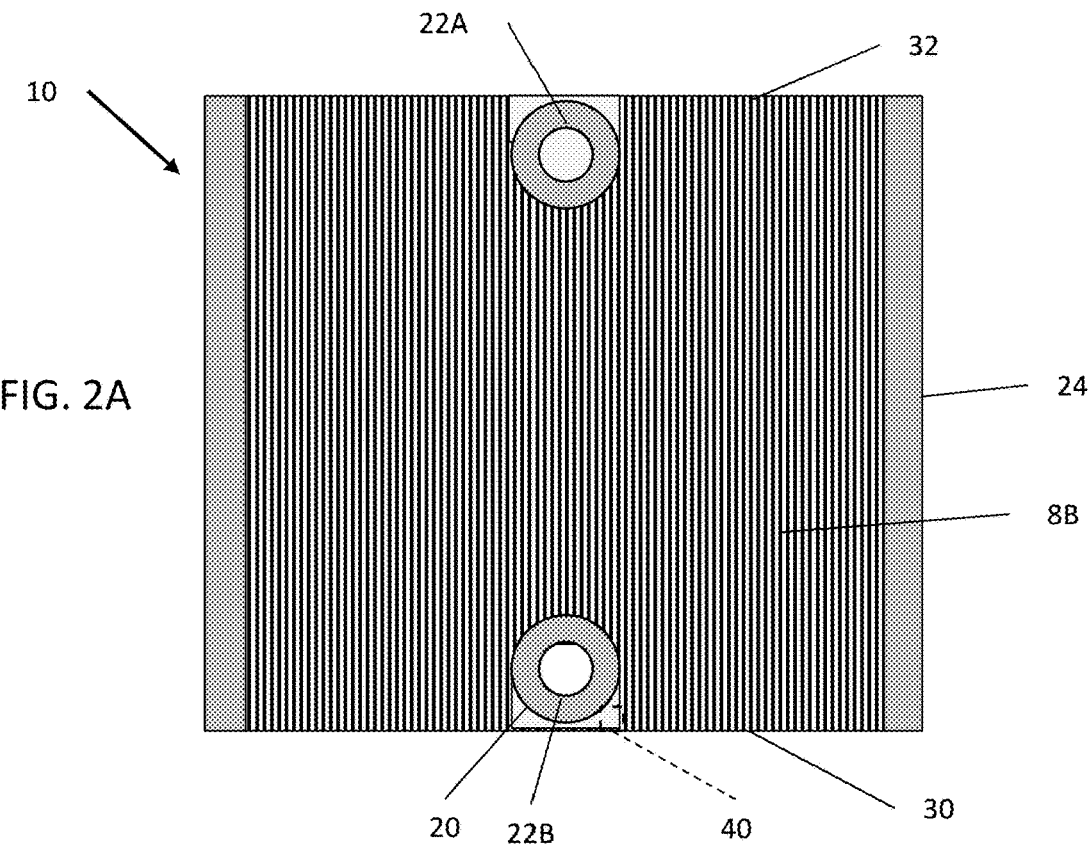
FIG. 2A is a plan view of an air side of an interconnect, according to various embodiments of the present disclosure.
Figure 2B:
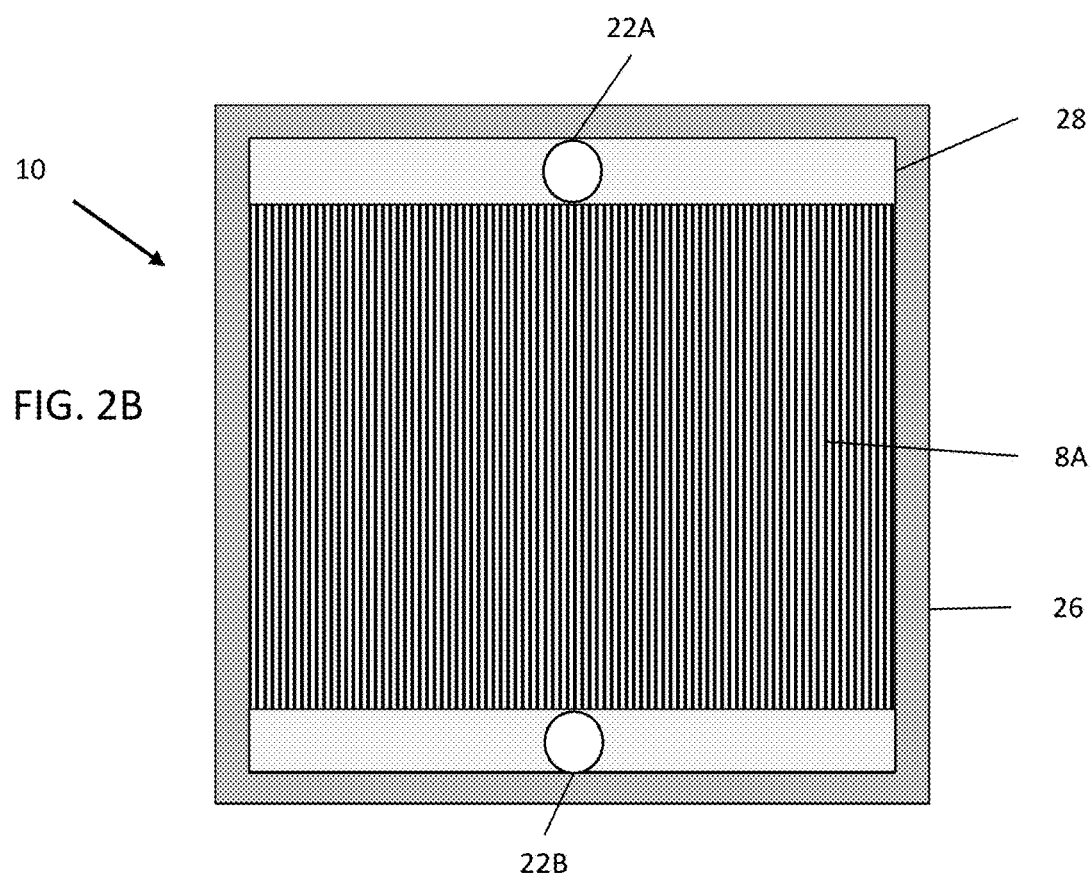
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges 30, 32 of the interconnect 10. Air flows through the air channels 8B to a cathode 3 of an adjacent fuel cell 1. Ring seals 20 may surround fuel holes 22A of the interconnect 10, to prevent fuel from contacting the cathode. Strip-shaped peripheral seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

In some embodiments, the air side of the interconnect 10 may include a window region 40. The window region 40 may be disposed on the first edge 30 and/or the second edge 32 of the interconnect 10, between one of the ring seals 20 and one of the peripheral seals 24. Accordingly, the window region 40 may extend from an edge of the interconnect 10, in an area that is not covered by the seals 20, 24. In other words, the window region 40 and the seals 20, 24 do not overlap.

The width of the window region 40, taken in a direction perpendicular to the air channels 8B, may range from about 0.25 cm to about 1.5 cm, such as from about 0.5 cm to about 1 cm, or about 0.75 cm. The length of the window region 40, taken in a direction parallel to the air channels 8B, may range from about 0.5 cm to about 2.0 cm, such as from about 0.75 cm to about 1.5 cm, or about 1.0 cm.

Within the window region 40, the ribs 12B may be reduced in height by from about 25% to about 95%, such as by from about 50% to about 90%, or by about 75%, as compared to the height of the reminder of the ribs 12B. In other embodiments, the ribs 12B may be absent or removed from the window region 40. In further embodiments, the window region 40 may be free of the ribs 12B and the thickness of the corresponding portion of the interconnect 10 may be reduced.

Referring to FIGS. 1B and 2B, the fuel side of the interconnect 10 may include the fuel channels 8A and fuel manifolds 28. Fuel flows from one of the fuel holes 22A (e.g., inlet fuel hole that forms part of the fuel inlet riser), into the adjacent manifold 28, through the fuel channels 8A, and to an anode 7 of an adjacent fuel cell 1. Excess fuel may flow into the other fuel manifold 28 and then into the outlet fuel hole 22B. A frame seal 26 is disposed on a peripheral region of the fuel side of the interconnect 10. The peripheral region may be an elevated plateau which does not include ribs or channels. The surface of the peripheral region may be coplanar with tops of the ribs 12A.

Figure 3A:
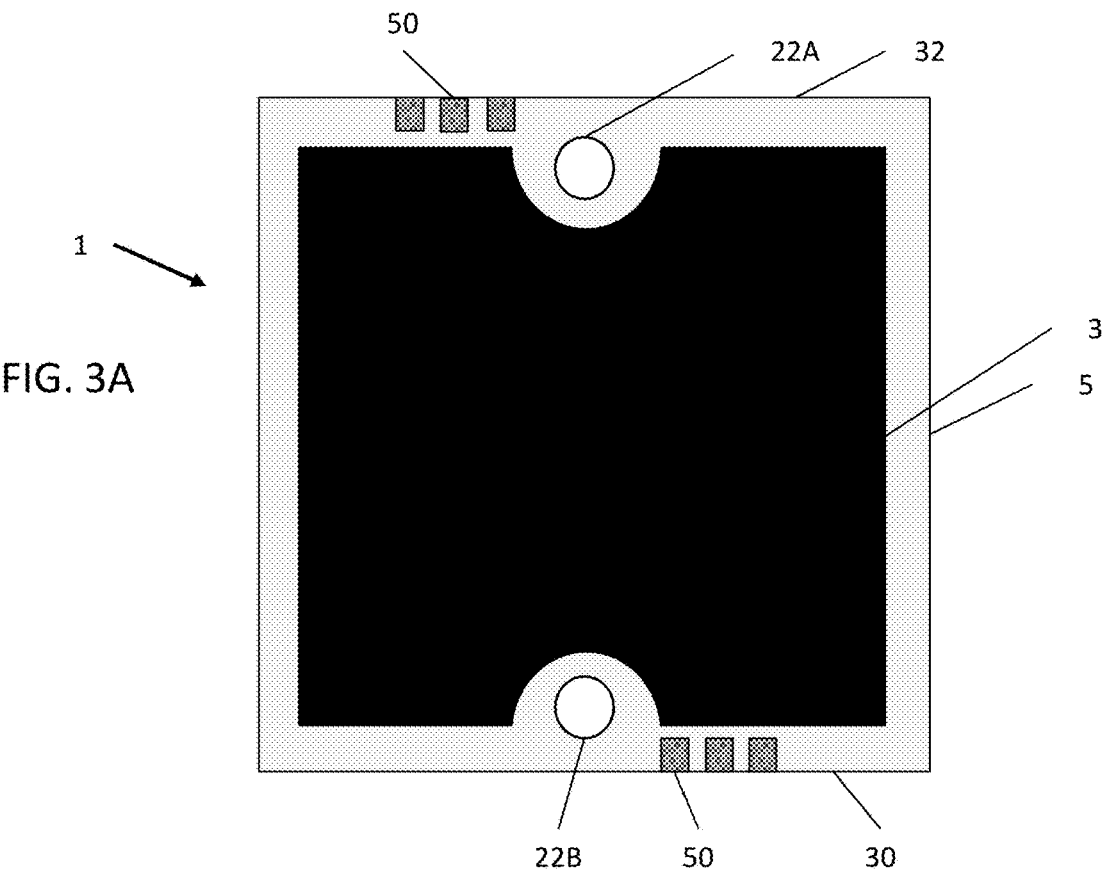
FIG. 3A is a plan view of an air side of a fuel cell, according to various embodiments of the present disclosure.
Figure 3B:
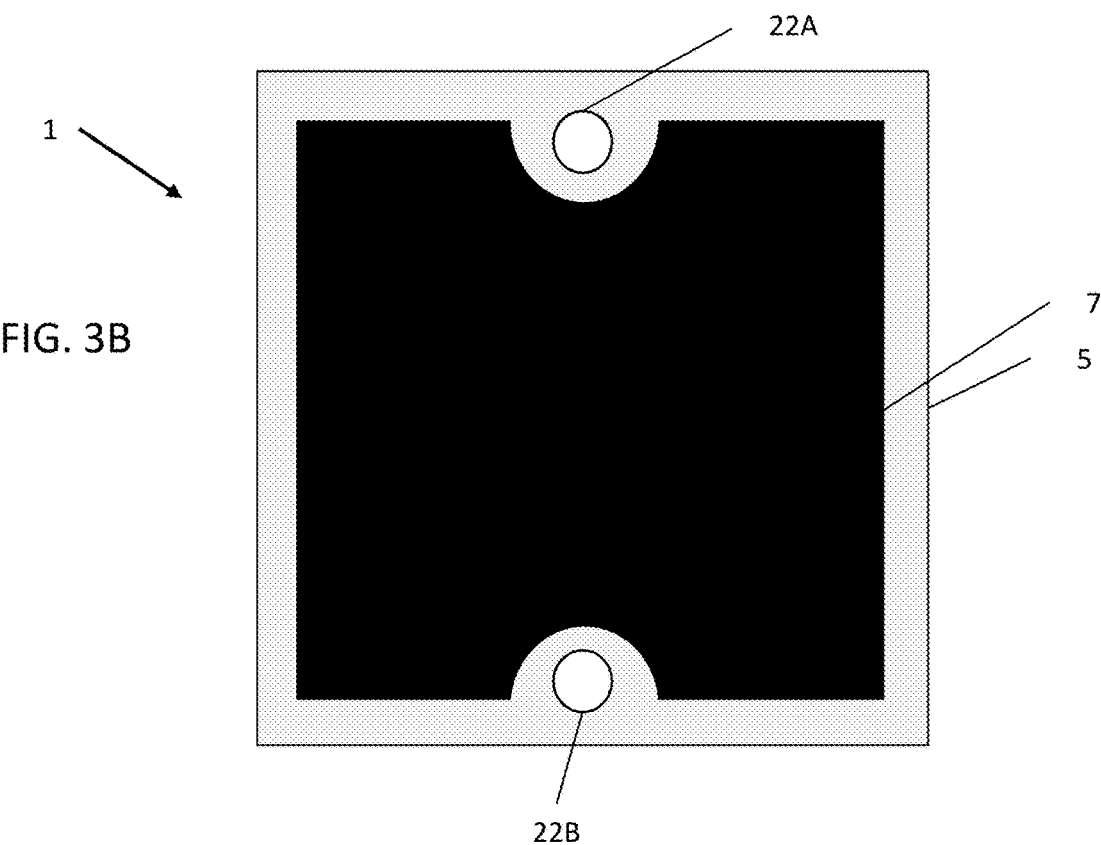
FIG. 3B is a plan view of a fuel side of the fuel cell of FIG. 3A.

FIG. 3A is a plan view of a cathode side (e.g., air side) of the fuel cell 1, and FIG. 3B is a plan view of an anode side (e.g., fuel side) of the fuel cell 1, according to various embodiments of the present disclosure. Referring to FIGS. 1A, 2A, 3A, and 3B, the fuel cell 1 may include an inlet fuel hole 22A, an outlet fuel hole 22B, the electrolyte 5, and the cathode 3. The cathode 3 may be disposed on a first side of the electrolyte 5. The anode 7 may be disposed on an opposing second side of the electrolyte 5. The fuel cell 1 may include a first edge 30 and an opposing second edge 32 that correspond to the first and second edges 30, 32 of the interconnect 10.

The fuel holes 22A, 22B may extend through the electrolyte 5 and may be arranged to overlap with the fuel holes 22A, 22B of the interconnects 10, when assembled in the fuel cell stack 100. The cathode 3 may be printed on the electrolyte 5 so as not to overlap with the ring seals 20 and the peripheral seals 24 when assembled in the fuel cell stack 100. The anode 7 may have a similar shape as the cathode 3. The anode 7 may be disposed so as not to overlap with the frame seal 26, when assembled in the stack 100. In other words, the cathode 3 and the anode 7 may be recessed from the edges of the electrolyte 5, such that corresponding edge regions of the electrolyte 5 may directly contact the corresponding seals 20, 24, 26.

The fuel cell 1 includes at least one witness mark 50 on at least one side of the fuel cell 1, such as on the cathode side. The witness mark 50 may be disposed so as to overlap with the window region 40 of an adjacent interconnect 10, when assembled in the fuel cell stack 100. For example, the witness mark 50 may be disposed on the first edge 30 of the fuel cell 1. However, in other embodiments, the witness mark 50 may be disposed on the second edge 32 of the fuel cell 1, or on both the first and second edges 30, 32 of the fuel cell 1. Alternatively, multiple witness marks 50 may be disposed on one edge or on plural edges of the fuel cell 1 for visual confirmation from all sides of the stack, as well as for further verification. For example, as shown in FIG. 3A, one or more first witness marks 50 (e.g., three witness marks) may be disposed on the first edge 30 of the fuel cell 1, and one or more second witness marks 50 (e.g., three witness marks) may be disposed on the second edge 32 of the fuel cell 1. In the embodiment shown in FIG. 3A, the witness marks are provided on the same location (e.g., same corner) even if the stack or the fuel cell 1 is rotated at 180°.

Accordingly, the witness mark 50 extends from one or more edges of the fuel cell 1, in one or more areas that do not overlap with the seals 20, 24. In other words, the witness mark 50 and the seals 20, 24 do not overlap in the stack 100. Alternatively, the witness mark 50 may be slightly offset from the edge(s) of the fuel cell 1 and may be located between the cathode 3 and the edge(s) (30, 32) of the electrolyte 5.

The witness mark 50 may have similar dimensions to the window region 40. For example, the width of the witness mark 50, taken in a direction perpendicular to the air channels 8B, may range from about 0.25 cm to about 1.5 cm, such as from about 0.5 cm to about 1 cm, or about 0.75 cm. The length of the witness mark 50, taken in a direction parallel to the air channels 8B, may range from about 0.5 cm to about 2.0 cm, such as from about 0.75 cm to about 1.5 cm, or about 1.0 cm. However, in some embodiments, the witness mark 50 may be larger or smaller than the window region 40.

The witness mark 50 may be printed on the electrolyte 5 using an ink that is stable at fuel cell operating temperatures, such as temperatures of 600° C. or higher. Accordingly, the witness mark 50 may be visible after sintering the fuel cell stack 100. In some embodiments, the witness mark 50 and the cathode 3 may be formed using the same ink (e.g., LSM ink) or different inks. The witness mark 50 may have any color, so long as the witness mark 50 is easily distinguishable from the electrolyte 5 by visual or optical inspection.

In some embodiments, the witness mark 50 may be at least one tab, cutout, or groove formed on the electrolyte 5, such as in the edge (30, 32) of the electrolyte 5, and/or in a region of the electrolyte 5 between the edge (30, 32) of the electrolyte 5 and the cathode 3. Accordingly, the witness mark 50 may be any type of mark that may be used to optically identify a particular side of the fuel cell 1.

In another embodiment, the witness mark 50 is printed on the cathode side of the electrolyte 5 at the same time as when the cathode 3 is printed to indicate the presence of the cathode 3. In addition or in the alternative, the witness mark 50 may be printed on the anode side of the electrolyte 5 at the same time as the anode 7 to indicate the presence of the anode 7.

Figure 4:
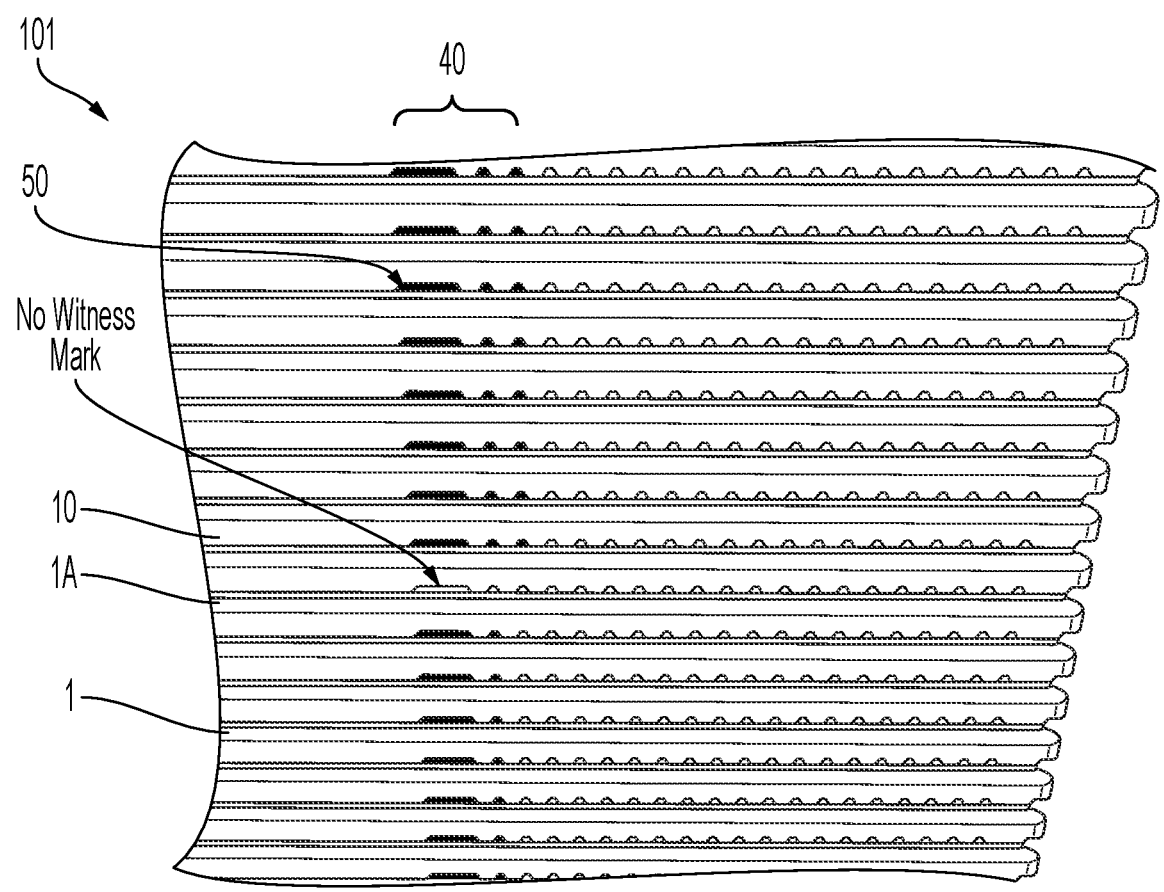
FIG. 4 is photograph of a fuel cell stack, according to various embodiments of the present disclosure.

FIG. 4 is a photograph of a portion of a fuel cell stack 101, according to various embodiments of the present disclosure. The stack 101 is similar to the stack 100 of FIG. 1, where like reference numbers refer to like elements.

Referring to FIG. 4, the fuel cell stack 101 includes interconnects 10 that include window regions 40, which are stacked between adjacent fuel cells 1 that include witness marks 50. As can be seen in FIG. 4, the window regions 40 overlap and expose the witness marks 50, such that the witness marks 50 may be easily identified from outside of the fuel cell stack 101. Since the witness marks 50 are disposed on the cathode side of each fuel cell 1, visible witness marks 50 can be used to identify the cells 1 that are properly oriented in the fuel cell stack 101. Similarly, the lack of a visible witness mark 50 can be used to identify cells that are not properly aligned (e.g., that are inverted with the cathode 3 facing the fuel channels of an adjacent interconnect) or to identify fuel cells that lack an anode or cathode.

For example, as shown in FIG. 4, fuel cell 1A is inverted with respect to the fuel cells 1. In other words, the cathode of the fuel cell 1A contacts the fuel side of an adjacent interconnect 10. As a result, the witness mark of the fuel cell 1A faces downward and is covered by a frame seal of the stack 101 and thus, is not visible without disassembling the stack 101. Further, only an unmarked portion of the electrolyte of the cell 1A is visible through the adjacent window region 40. As such, a technician or an automated optical device can readily determine that fuel cell 1A is not properly oriented, through an external inspection the stack 101. For example, an automated optical inspection apparatus to detect the witness marks using infrared radiation or visible light that is provided onto the witness marks 50.

Accordingly, witness marks may be used, with or without corresponding window regions, to easily identify improperly oriented/inverted fuel cells and/or fuel cells lacking a cathode or anode, in a fuel cell stack.

Figure 5:
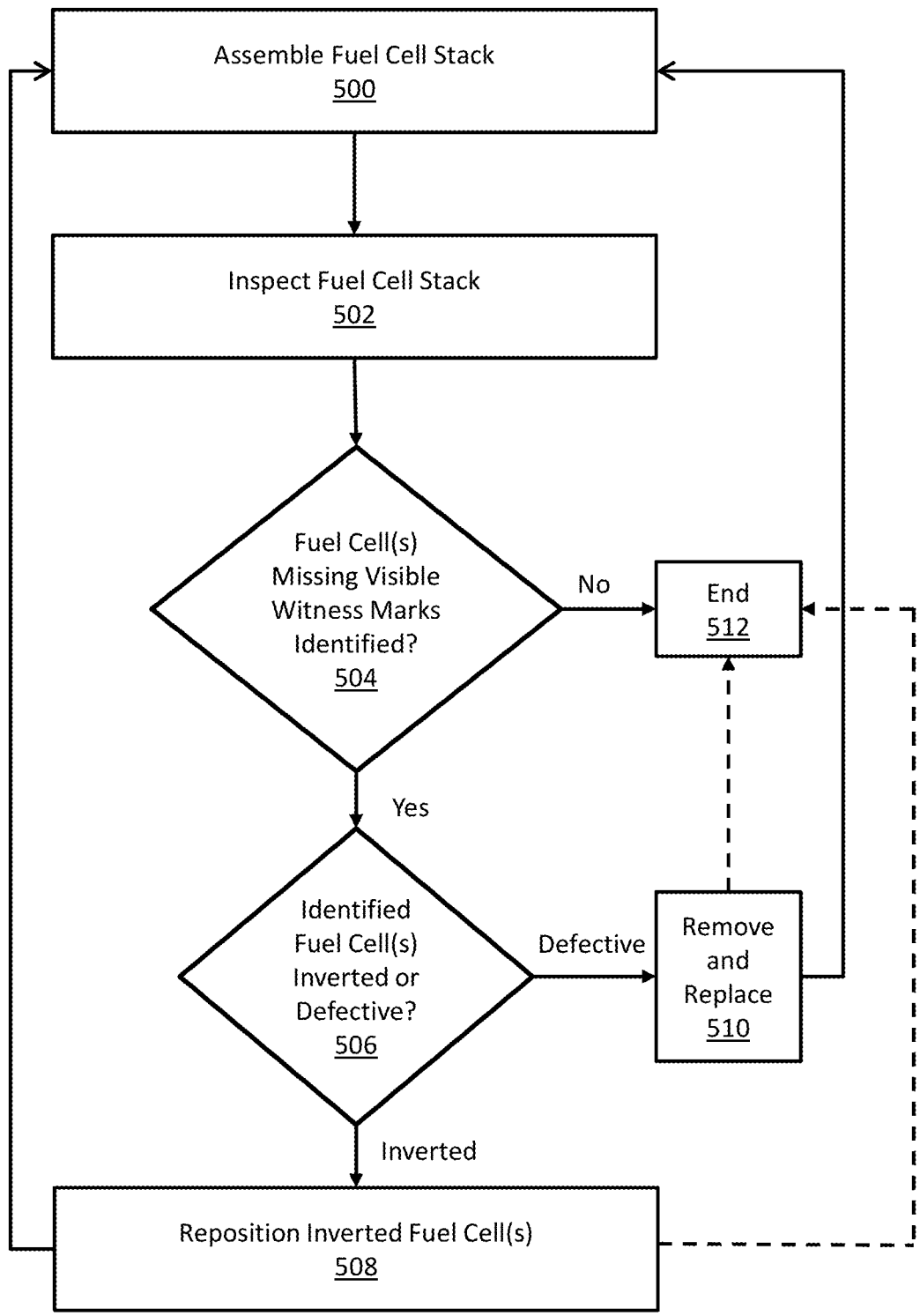
FIG. 5 is a block diagram of a method of forming a fuel cell stack, according to various embodiments of the present disclosure.

FIG. 5 is a block diagram depicting a method of forming a fuel cell stack, according to various embodiments of the present disclosure. Referring to FIG. 5, in step 500, the method includes assembling a fuel cell stack. For example, the fuel cell stack may include fuel cells having witness marks and interconnects that may optionally include window regions. In some embodiments, step 500 may optionally include forming witness marks on fuel cells, as described above. The stack is assembled by alternately stacking fuel cells and interconnects with seal material located between them.

In step 502, the method includes inspecting the fuel cell stack. For example, the inspection may include a visual inspection by a person (e.g., technician) or an optical inspection using an automated inspection apparatus.

In step 504, a determination is made as to whether any fuel cells do not have visible witness marks when inspected from the side of the stack are identified. If any such fuel cells are identified, the method proceeds to step 506. In one embodiment, when the first fuel cell without a visible witness mark is identified, then the method proceeds to step 506. In another embodiment, the entire stack is inspected, and the location of all identified fuel cells lacking the visible witness mark is noted. The method then proceeds to step 506 after the entire stack is inspected.

In step 506, a determination is made as to whether the identified fuel cell is inverted or is a defective fuel cell (e.g., lacks an anode or cathode). If step 504 proceeds to step 506 after identification of the first fuel cell that lacks a witness mark, then the determination in step 506 is made on only the single identified fuel cell. If step 504 includes inspection of the entire stack, then the determination in step 506 is made on all identified fuel cells in the stack. The inspection may be visual or may utilize an automated inspection apparatus.

If an identified fuel cell or cells is/are inverted, then in step 508, the stack is partially disassembled and the identified fuel cell may be repositioned to obtain the proper orientation. For example, the identified fuel cell may be flipped upside down in the stack, and the rest of the stack elements placed back in the stack in the original order. If step 504 proceeds to step 506 after identification of the first fuel cell that lacks a witness mark, then the method may then return to step 500. If step 504 includes inspection of the entire stack, then the method may be completed at step 512 after repositioning and/or replacement of all identified fuel cells in the stack.

If an identified fuel cell is determined to be defective (e.g., lacking one or both electrodes) in step 506, then the method proceeds to step 510 and the defective fuel cell may be removed from the stack and replaced with a non-defective fuel cell that includes both electrodes. If step 504 proceeds to step 506 after identification of the first fuel cell that lacks a witness mark, then the method may then return to step 500. If step 504 includes inspection of the entire stack, then the method may be completed at step 512 after repositioning and/or replacement of all identified fuel cells in the stack.

If the identified fuel cell is determined to be neither inverted nor defective after inspection (e.g., if the identified fuel cell has a missing witness mark or an improperly placed witness mark), then the method either returns to step 502 or ends at step 512.

Once the entire stack has been inspected and it is determined that all fuel cells in the stack have witness marks, the method ends at step 512.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:
1. A solid oxide fuel cell comprising:
a solid oxide electrolyte;
a cathode disposed on a first side of the electrolyte;
an anode disposed on an opposing second side of the electrolyte; and
a witness mark deposited on the first side of the electrolyte, outside of a perimeter of the cathode and inside a perimeter of the electrolyte.

2. The solid oxide fuel cell of claim 1, wherein the witness mark is disposed on an edge of the first side of the electrolyte and is not covered by the cathode.

3. The solid oxide fuel cell of claim 1, wherein:
the witness mark is formed by depositing an ink that is stable at a temperature of at least 600° C.; and
the witness mark has a first color and the electrolyte has a different second color.

4. A method of forming a fuel cell stack, the method comprising:
assembling a fuel cell stack comprising fuel cells and interconnects separating the fuel cells, the fuel cells each comprising a cathode disposed on a first side of a solid oxide electrolyte, an anode disposed on a second side of the electrolyte, and a witness mark disposed on the first side of the electrolyte, outside of a perimeter of the cathode and inside a perimeter of the electrolyte;
externally inspecting the stack to identify any fuel cells that do not have witness marks that are visible outside of the stack; and
determining whether any identified fuel cells are inverted or defective.

5. The method of claim 4, wherein when any identified fuel cell is determined to be inverted, the method further comprises:
at least partially disassembling the stack; and
repositioning the inverted fuel cell and reassembling the stack, such that the witness marks of the repositioned fuel cell is visible outside of the stack.

6. The method of claim 5, wherein the repositioning the inverted fuel cell comprises inverting the inverted fuel cell.

7. The method of claim 4, wherein when any of the identified fuel cell is determined to be defective due to lack of at least one of the anode or the cathode, the method further comprises:
at least partially disassembling the stack; and
replacing the defective fuel cell with a non-defective fuel cell that includes the anode and the cathode.

8. The method of claim 4, wherein:
the interconnects comprise window regions configured to increase the visibility of the witness marks;
the interconnects comprise ribs disposed on air side of each interconnect and at least partially defining oxidant channels;
the ribs have a reduced height in the window regions as compared to a remainder of the ribs or the ribs are not present in the window regions; and
assembling the fuel cell stack comprises overlapping the witness marks and the window regions in a stacking direction of the fuel cells.

9. The method of claim 4, wherein externally inspecting the stack comprises:
visually inspecting the stack; or
using an automated device to optically inspect the stack.

10. The method of claim 4, wherein:
the interconnects comprise window regions, and
the witness mark is visible from outside of the stack through the window region of a respective one of the interconnects facing the cathode only when the fuel cell is properly assembled in the stack.

11. The method of claim 4, wherein the witness mark is visible from outside of the stack only when the fuel cell is properly assembled in the stack.

12. A fuel cell stack, comprising the solid oxide fuel cell of claim 1 located between first and second interconnects, wherein the witness mark is visible from outside of the stack only when the fuel cell is properly assembled in the stack.

13. The fuel cell stack of claim 12, wherein:
   the first interconnect comprises a window region; and
   the witness mark is visible from outside of the stack through the window region of the first the interconnect facing the cathode only when the fuel cell is properly assembled in the stack.

* * * * *